United States Patent [19]
Ellett

[11] Patent Number: 5,213,133
[45] Date of Patent: May 25, 1993

[54] PRESSURE RESPONSIVE PILOT CONTROL VALVE

[75] Inventor: James R. Ellett, Edmonton, Canada

[73] Assignee: Barber Industries Ltd., Calgary, Canada

[21] Appl. No.: 772,221

[22] Filed: Oct. 4, 1991

[51] Int. Cl.⁵ .............................................. F16K 17/00
[52] U.S. Cl. ....................... 137/596.14; 137/458; 137/596.18
[58] Field of Search ............... 137/458, 627.5, 625.66, 137/596.18, 596.14, 625.6

[56] References Cited

U.S. PATENT DOCUMENTS

| | | | |
|---|---|---|---|
| 3,443,596 | 5/1969 | Klenk | 137/627.5 |
| 3,756,264 | 9/1973 | Fisher | 137/627.5 X |
| 4,117,865 | 10/1978 | Beck | 137/627.5 |
| 4,494,508 | 1/1985 | Young | 137/458 X |
| 4,738,278 | 4/1988 | Sauder | 137/627.5 X |
| 4,961,560 | 10/1990 | Ellett | 251/63.5 |

FOREIGN PATENT DOCUMENTS 948954 6/1974 Canada.
955146 9/1974 Canada.

OTHER PUBLICATIONS

Axelson product information publication "High-Low Pressure Sensors"— undated.

*Primary Examiner*—Alan Cohan
*Attorney, Agent, or Firm*—John Russell Uren

[57] ABSTRACT

A pressure responsive pilot control valve has a spool which is movable by a metal diaphragm sensing the pressure in a flowline. The spool includes two poppet seal rings mounted thereon, the poppet seal rings having concentric axes and which are used for opening and closing fluid ports. The fluid ports are opened and closed for the purpose of sending a signal to a latching relay valve to bleed off a shut in valve actuator which will terminate flow in the flowline. The poppet seal rings of the pilot move responsive to a high or a low pressure condition. A low pressure spring is provided for measuring a low pressure condition and a high pressure spring is provided for measuring a high pressure condition.

14 Claims, 7 Drawing Sheets

PRESSURE RESPONSIVE PILOT CONTROL VALVE

INTRODUCTION

This invention relates to a pressure responsive pilot control valve and, more particularly, to a pilot control valve which responds to both a high and low pressure condition by a signal resulting from either of such conditions.

BACKGROUND OF THE INVENTION

Pressure responsive pilot control valves act to provide a signal when a high or low pressure condition is sensed within the flowline or process to which such pilot valves are operably connected. A high pressure condition may be created in the line by a blockage and in such event, the well head pressure may exceed the line rating which can result in line rupture. A low pressure condition may be created when there exists leakage in the line. In either case, it is imperative that a signal be sent that will terminate the flow within the oil or gas line to prevent spills and damage to equipment. For example, the signal forwarded by the pilot control valve may conveniently be pneumatic or hydraulic and such signal may be passed to a latching relay valve which, in turn, controls a shut-in valve which can close and terminate pipeline flow.

At the present time, there are pilot valves being marketed which are operable to sense only a high or only a low pressure condition but not both conditions. If both high and low pressures are to be sensed with present apparatuses, two pilot valves may be required, one to sense the high condition and the other to sense the low condition. Each pilot requires its concomitant manifold and associated hardware with the result that the equipment is unnecessarily expensive and bulky.

Certain other pilot valves are being marketed which do sense high and low conditions but which are incapable of responding to the range of pressures which can be covered by the pilot valve according to the present invention.

A further problem with present equipment is that, often, the pilot valve must be operated in conditions that are severe such as those areas offshore and in the coastal regions such as the Gulf Coast. Certain construction materials are particularly vulnerable to such operating conditions with the result that they corrode over time and operate unsatisfactorily under such conditions. Also, certain forms of construction of pilot valves are not readily manufactured at reasonable cost with the corrosion resistant materials that are required. Thus, they are too expensive for many applications. In addition, some pilots, in utilising O-rings for sealing that move over the ports, subject the O-rings to flexing, inconsistent loading and wear with the result that failures and breakdowns may more frequently occur.

A further disadvantage in respect of many latching relay valves used in association with pilot valves, including the trip valve shown in our U.S. Pat. No. 4,961,560 is that they are typically used for lower pressures and, in such event, a spool and O-ring may be used. It is difficult to have an O-ring seat on both the body and spool of a relay valve and, further, the seal may lack integrity at higher pressures when a large area of the O-ring is exposed to such pressures. This is disadvantageous when the relay valve is intended to be used under conditions of higher pressure such as when they are used for flowlines transporting gas.

SUMMARY OF THE INVENTION

According to one aspect of the invention, there is provided a pilot valve responsive to pressure changes comprising a base housing; an inlet in said base housing exposed to a pressure to be monitored; a diaphragm in said inlet within said base housing; a lower body operably connected to said base housing; a spool movable within a cavity in said lower body; inlet, exhaust and signal ports extending from the outside of said lower body to said cavity; annular grooves in said spool communicating with cross ports within said body and said spool, a first spring biased poppet seal ring mounted about said spool and being movable between a first position wherein said poppet contacts said spool when said pressure is within normal operating pressure range and a second position out of contact with said spool and in contact with said body when said pressure is one of either higher or lower than the normal operating pressure range by a predetermined amount.

According to a further aspect of the invention, there is provided a three way latching relay valve for sensing a pilot control valve signal, said valve comprising a housing, a spool mounted for reciprocal movement within said housing, means to provide reciprocal movement to said spool, a signal sensing control port to provide fluid pressure acting on said spool, inlet, signal and exhaust ports extending from the outside of said body to said spool, a spring biased poppet seal ring mounted on said spool and being movable relative to said spool, said poppet moving between a first or armed position wherein said poppet seal ring contacts said spool and thereby allows fluid to be routed between said signal and inlet ports, and a second or tripped position wherein said poppet seal ring contacts said body and thereby allows fluid to be routed between said signal and said exhaust ports.

BRIEF DESCRIPTION OF THE SEVERAL VIEWS OF THE DRAWINGS

An embodiment of the invention will now be described, by way of example only, with the use of the drawings in which.

DESCRIPTION OF SPECIFIC EMBODIMENT

Figure 1:
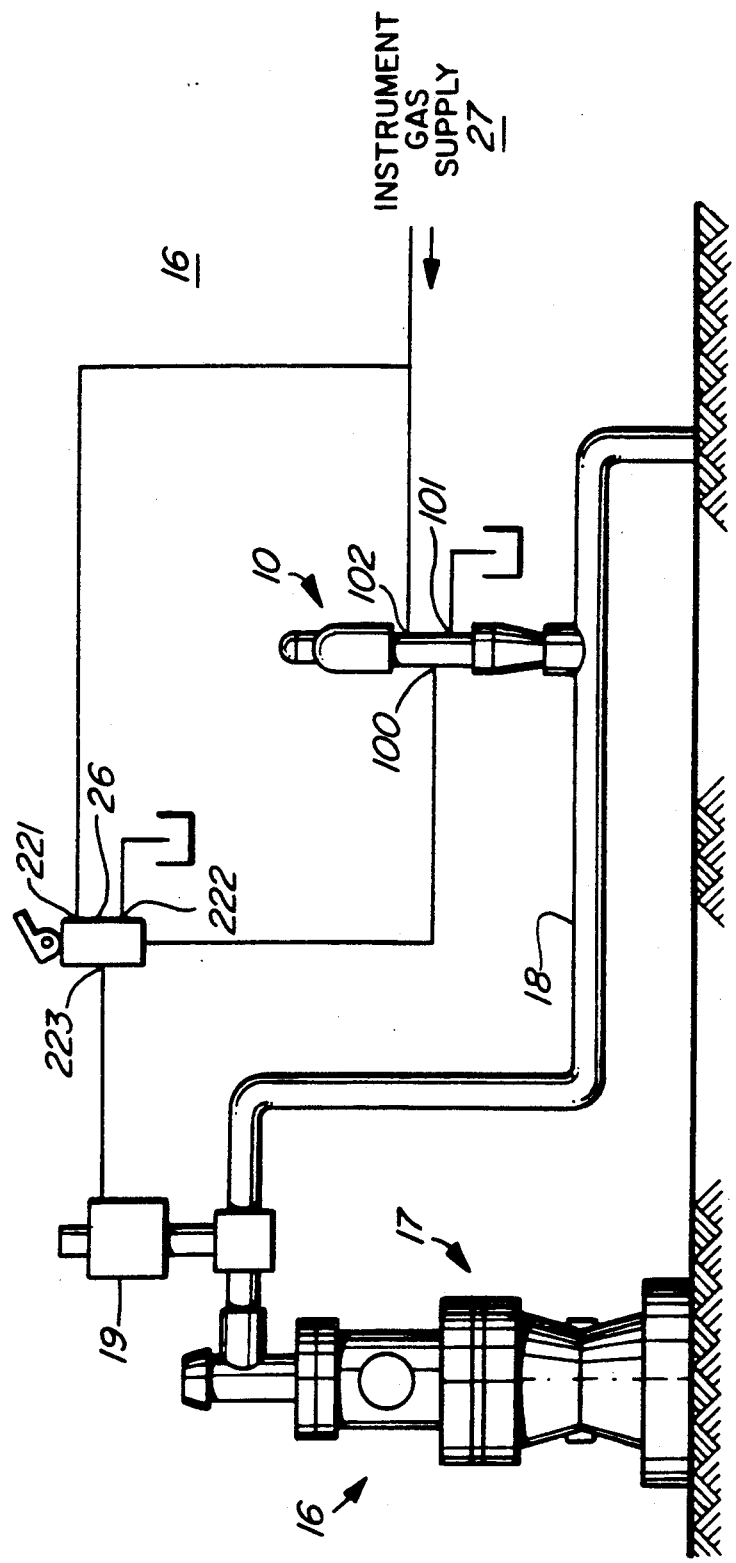
FIG. 1 is an isometric diagrammatic view of the pilot valve according to the invention in its operative relationship with other elements of a flowline shutdown system.

Referring now to the drawings, a flowline shutdown system is generally illustrated at 16 in FIG. 1. It comprises a wellhead generally illustrated at 17 which produces the gas or fluid for the flowline 18. An emergency wellhead shut in valve is generally illustrated at 19 and a pressure responsive pilot control valve according to the present invention is generally illustrated at 10. The pilot control valve 10 is connected to a latching relay valve 26 which, in turn, is operably connected to the shut in valve 19 and an instrument gas supply generally illustrated at 27.

Figure 2:
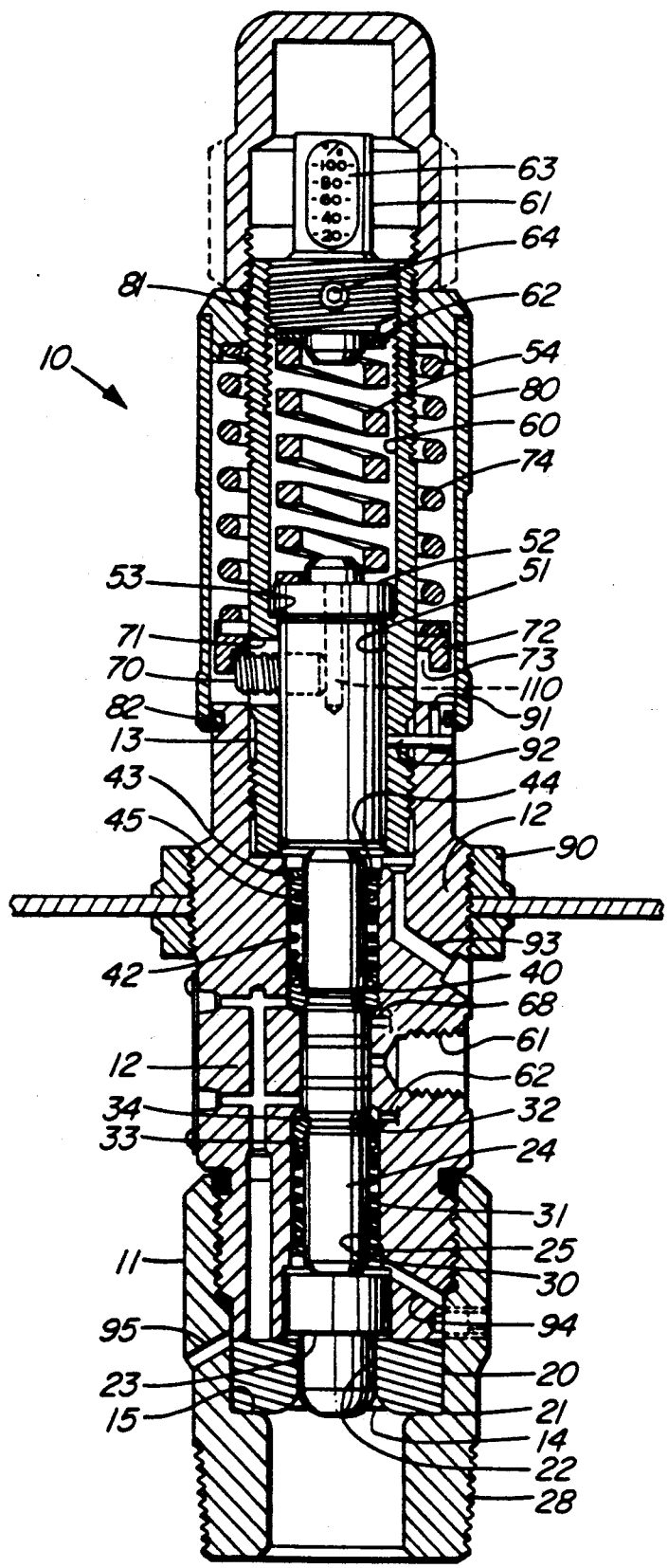
FIG. 2 is a cross-sectional view of the pilot valve according to the present invention.

With reference to FIG. 2, the pressure responsive pilot control valve 10 comprises three (3) principle assembled components, namely a base housing 11, a lower body 12 threadedly engaged with the base housing 11 and an upper body 13 threadedly engaged with the lower body 12. Base housing 11 has a threaded outer and lower circumference 28 which may be used to mount the valve 10 directly to the flow line 18.

A metal diaphragm 14 is manufactured from a corrosion resistant material, conveniently 718 INCONEL material and has a thickness of 0.007 inches. Diaphragm 14 is mounted on annular shoulder 15 and, because of its material, it has a low stroke capability; that is, it will consistently move only a small distance responsive to pressure changes in the flowline and, accordingly, the valve 10 must be designed to function with a low stroke. A piston guide 20 is positioned on top of metal diaphragm 14 and an annular gasket 21 is positioned between the piston guide 20 on the metal diaphragm 14 around the inside diameter of base housing 11 adjacent to the shoulder 15.

The lower body 12 is threadedly engaged with base housing 11 and maintains the metal diaphragm 14 and the piston guide 20 in position on shoulder 15.

Piston guide 20 has a hole 22 therein and a piston 23 is positioned within hole 22 and bears on the upper surface of diaphragm 14. The piston 23 is adapted to reciprocate within piston guide 20 under the influence of diaphragm 14.

A spool 24 manufactured from a corrosion resistant material, conveniently stainless steel, is mounted for reciprocal movement within lower body 12 and bears on piston 23. A retaining ring 25 is mounted within the lower body 12 and a spool guide 30 is positioned above retaining ring 25. A seal spring 31 is positioned above retaining ring 25 and spool guide 30 and a high seal ring or poppet 32 made from a plastic material, conveniently NYLATRON, with an O-ring 33 is mounted on the spool 24. Groove 34 on spool 24 acts as a fluid passageway as will be more specifically described hereafter.

A low pressure seal ring or poppet 40 is likewise mounted on spool 24 together with O-ring 41 and is likewise made from a plastic material such as NYLATRON. A second seal spring 42 is mounted on top of low seal ring or poppet 40 and it extends up to retaining ring 43 and spool guide 44. O-rings 45 are mounted in spool guide 44. Thus, as spool 24 reciprocates within the lower body 12, one of the seal springs 31, 42 will compress while the other of the seal springs 31, 42 will extend.

A transfer block 50 is mounted within the base 51 of upper body 13 and bears on the top of spool 24. A spring button 52 is mounted so as to bear on a shoulder 53 of upper body 13 when the transfer block 50 is below shoulder 53 and also to bear on the top of the transfer block 50 when the top of the transfer block 50 is above shoulder 53.

A high pressure spring 54 is mounted on spring button 52 and extends upwardly within an internal cavity 60. A high adjustor 61 with a thrust washer 62 is threadedly engaged with upper body 13 and moves upwardly or downwardly to adjust the initial force in high pressure spring 54. High adjustor 61 has an adjustment scale 63 to indicate the spring force adjustment and a locking insert 64 is provided to maintain the high adjustor 61 in its preferred position following adjustment.

Transfer block 50 is provided with three (3) transfer pins 70 which are threadedly engaged with transfer block 50. The pins 70 extend laterally from the transfer block 50 and reciprocate with the transfer block 50 in respective slots 71 in upper body 13. Slots 71 each have a length which is designed to accommodate the movement of transfer pins 70 with transfer block 50.

A thrust ring 72 with an inner annular groove 73 bears on the three (3) transfer pins 70 and a low pressure spring 74 is positioned on the top of transfer pins 70. A low adjuster 80 is threadedly engaged with upper body 13 at 81 and this adjuster 80 moves so as to adjust the initial spring force. Low pressure spring 74 extends upwardly from thrust ring 72 and contacts the inside of low adjuster 80. An O-ring 82 is positioned in lower body 12 adjacent to the transfer pins 70. O-ring 82 is used to seal the inside of pilot 10 from ambient conditions. A top cap or cover 83 is threadedly mounted on the top of upper body 13. An O-ring 84 is positioned between cover 83 and lower adjuster 80. Its purpose is likewise to prevent the ingress of foreign material from outside the pilot valve 10.

An escutcheon ring 90 is threadedly engaged with the outer surface of lower body 12. Its purpose is to maintain the pilot valve 10 in its desired position when installed in a mounting bracket or the hole of a central panel (not illustrated).

A drain port 91 is provided in lower body 12 for allowing fluid to exit from inside the pilot valve 10. A retaining pin 92 is provided between upper body 13 and lower body 12 so that upper body 13 and lower body 12 maintain a consistent threaded engagement with each other. Second and third drain ports 93, 94, respectively, are also provided in lower body 12 for the same purpose as drain port 91 and a further drain port 95 is provided in the base housing 11.

Guide pin 110 maintains the spring button 52 and the transfer block 50 in a concentric relationship.

Signal, exhaust and inlet ports 100, 101, 102, respectively, are provided in lower body 12 as indicated. The signal and inlet ports 100, 102, respectively, are opened and closed by the low seal ring 40 and the high seal ring 32, respectively, as will be described in greater detail hereafter. The use of the ports 100, 101, 102 initiates action by way of the latching relay valve 26 to terminate flow through the pipeline by the operation of shut in valve 19.

Figure 4A:
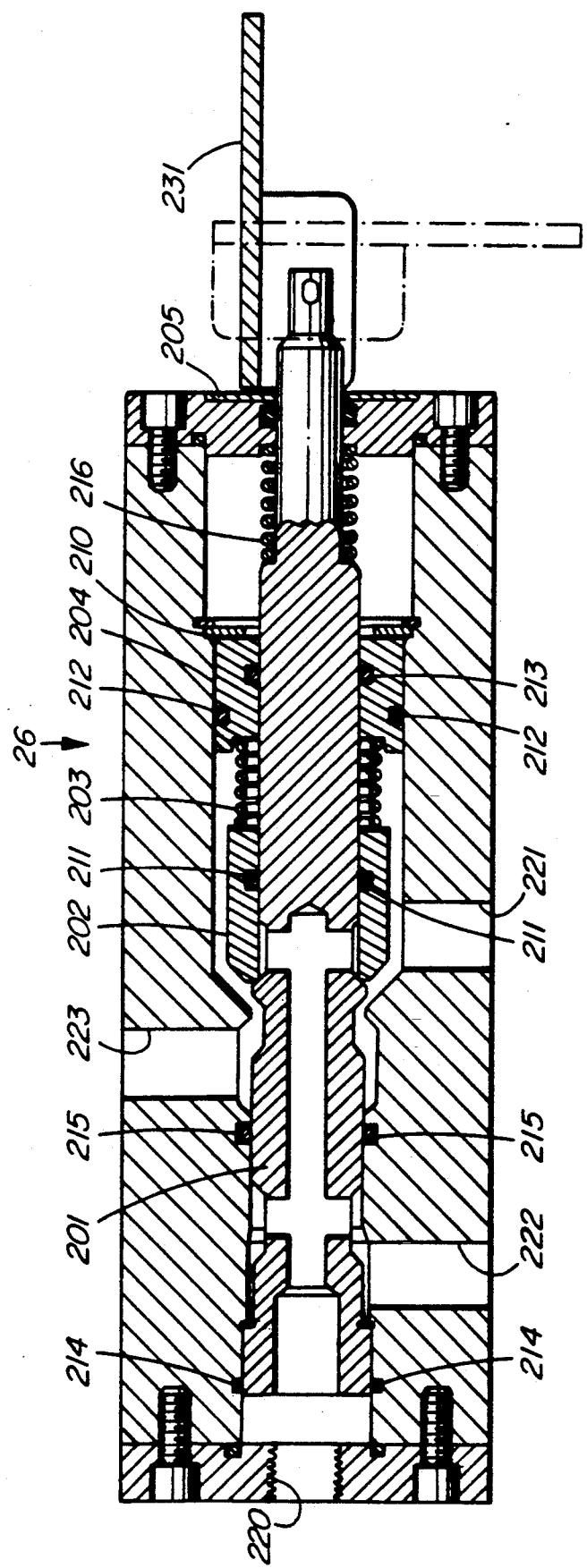
FIG. 4A is a diagrammatic cross-sectional view of the three way latching relay valve according to the invention in a further embodiment with the relay valve illustrated in its latched or armed position.
Figure 4B:
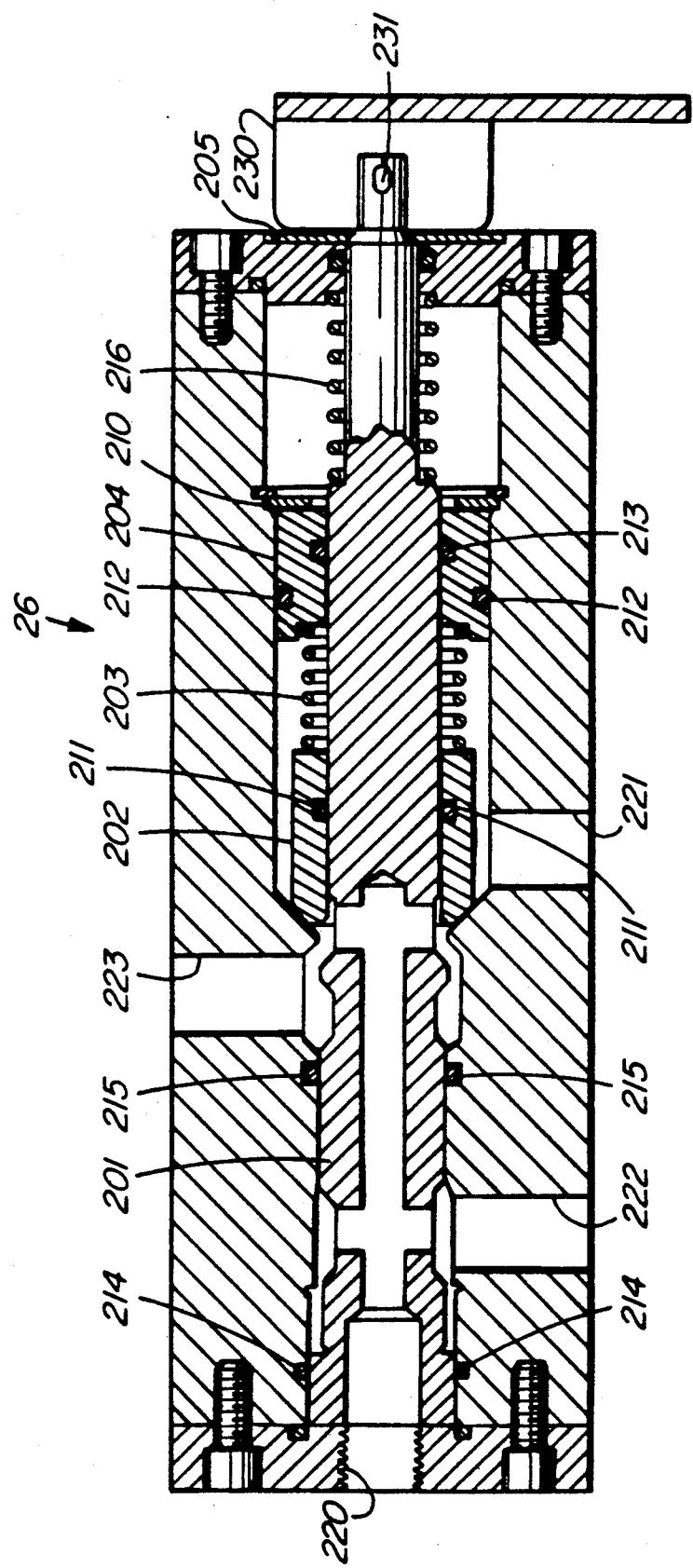
FIG. 4B is a diagrammatic cross-sectional view of the latching relay valve according to FIG. 4A but with the relay valve illustrated in its tripped position.

The latching relay valve 26 operably connected to pilot valve 10 is illustrated diagrammatically in its "armed" position illustrated in phantom and in its "latched" position in FIG. 4A and in its "tripped" position in FIG. 4B.

The latching trip valve 26 has a body 200 and a spool 201 movable between the armed or latched position as illustrated in FIG. 4A and the tripped position as seen in FIG. 4B. A toggle 230 is connected to the end of spool 201 and rotates about axis 231 as will be described. A poppet 202 is biased by a spring 203 extending between the poppet 202 and a spool guide 204 which, in turn, bears on retaining ring 210. Three O-rings 211, 212, 213 act as seals between the spool guide 204, the poppet 202 and the body 200. A further two O-rings 214, 215 act as seals between the spool 201 and the body 200 as illustrated in FIGS. 4A and 4B. A wear resistant washer 205 is mounted about the periphery of spool 201.

A control port 220 which is connected to the signal port 100 of pilot valve 10 (FIG. 1) allows the fluid from the pilot valve 10 to move the spool 201 of the latching trip valve 26. Inlet, exhaust and signal ports 221, 222, 223, respectively, are also provided as illustrated, the operation of which will be described in greater detail hereafter.

OPERATION

Initially and with reference to FIG. 4A, the latching relay valve 26 is manually moved to its "latched" position as illustrated moving spool 201 with toggle 230 by rotating toggle 230 about axis 231. The gas from the instrument gas supply 27 (FIG. 1) will move through inlet port 221 and out signal port 223. This will open the shut in valve 19. Fluid flow will then commence from the wellhead 17 through flowline 18.

Figure 3A:
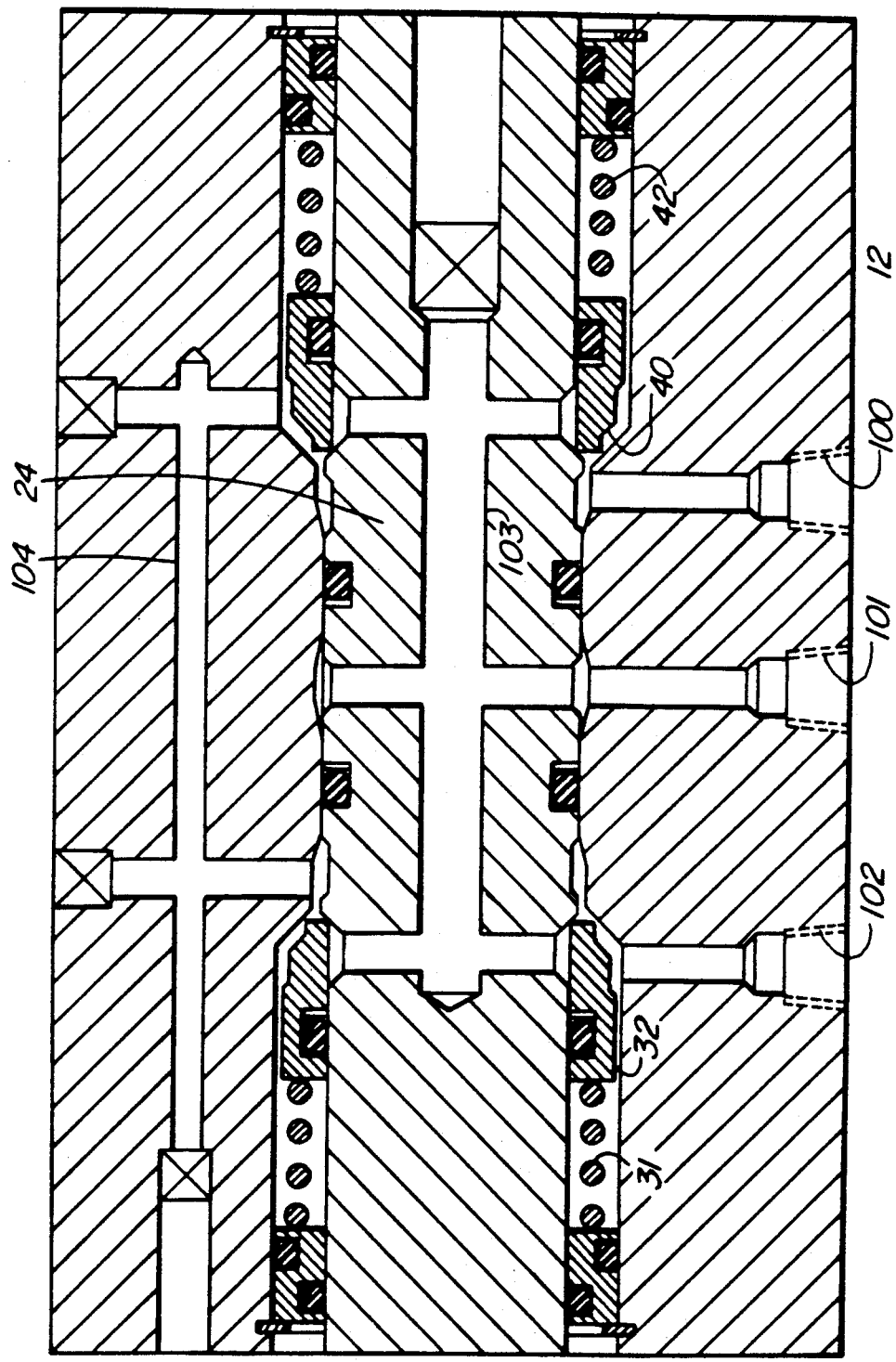
FIGS. 3A, 3B and 3C are enlarged partially cross-sectional diagrammatic views of the fluid flow taking place within the pilot valve when the pressure in the flowline is normal, low or high, respectively.
Figure 3B:
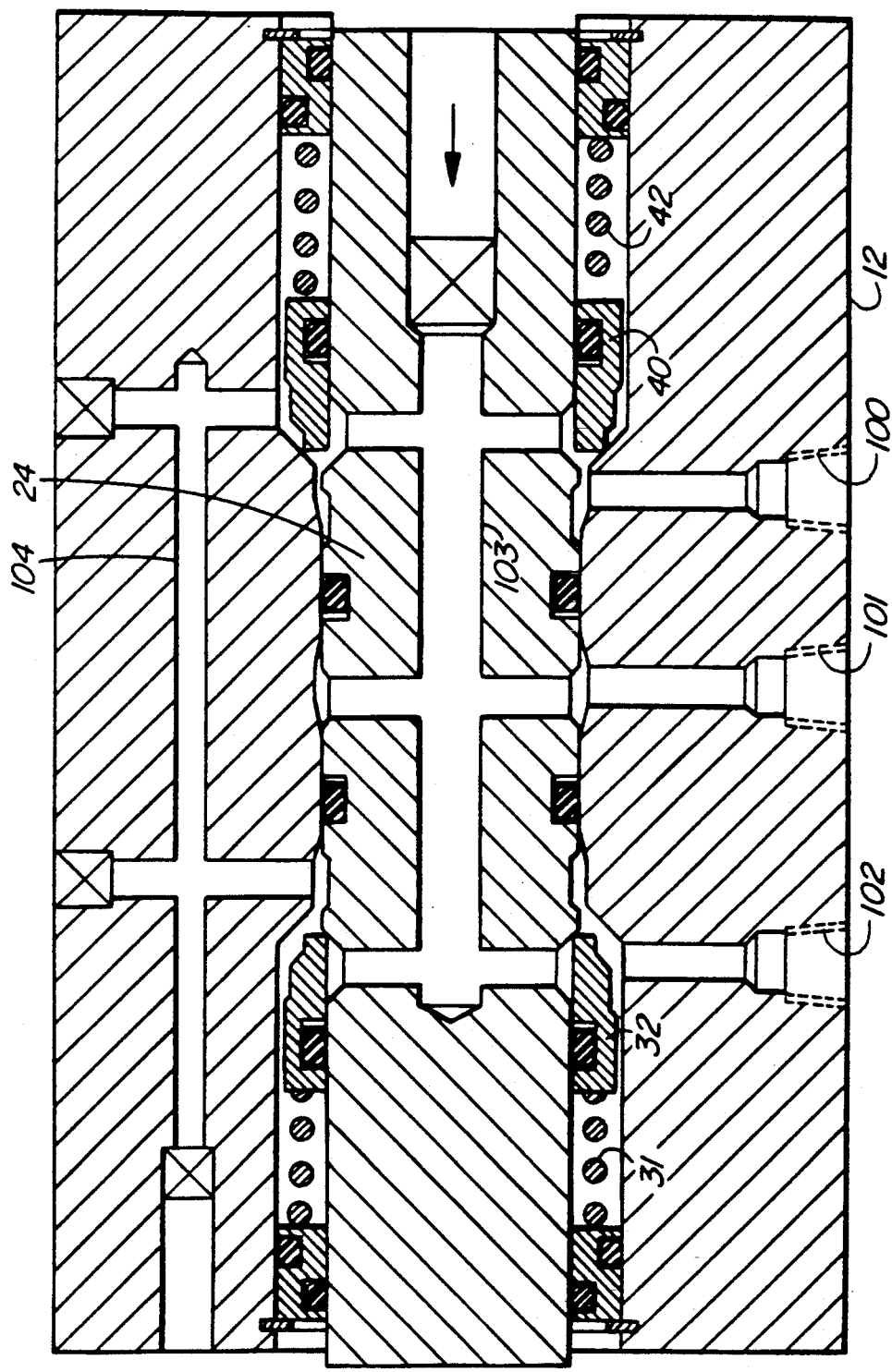
Figure 3C:
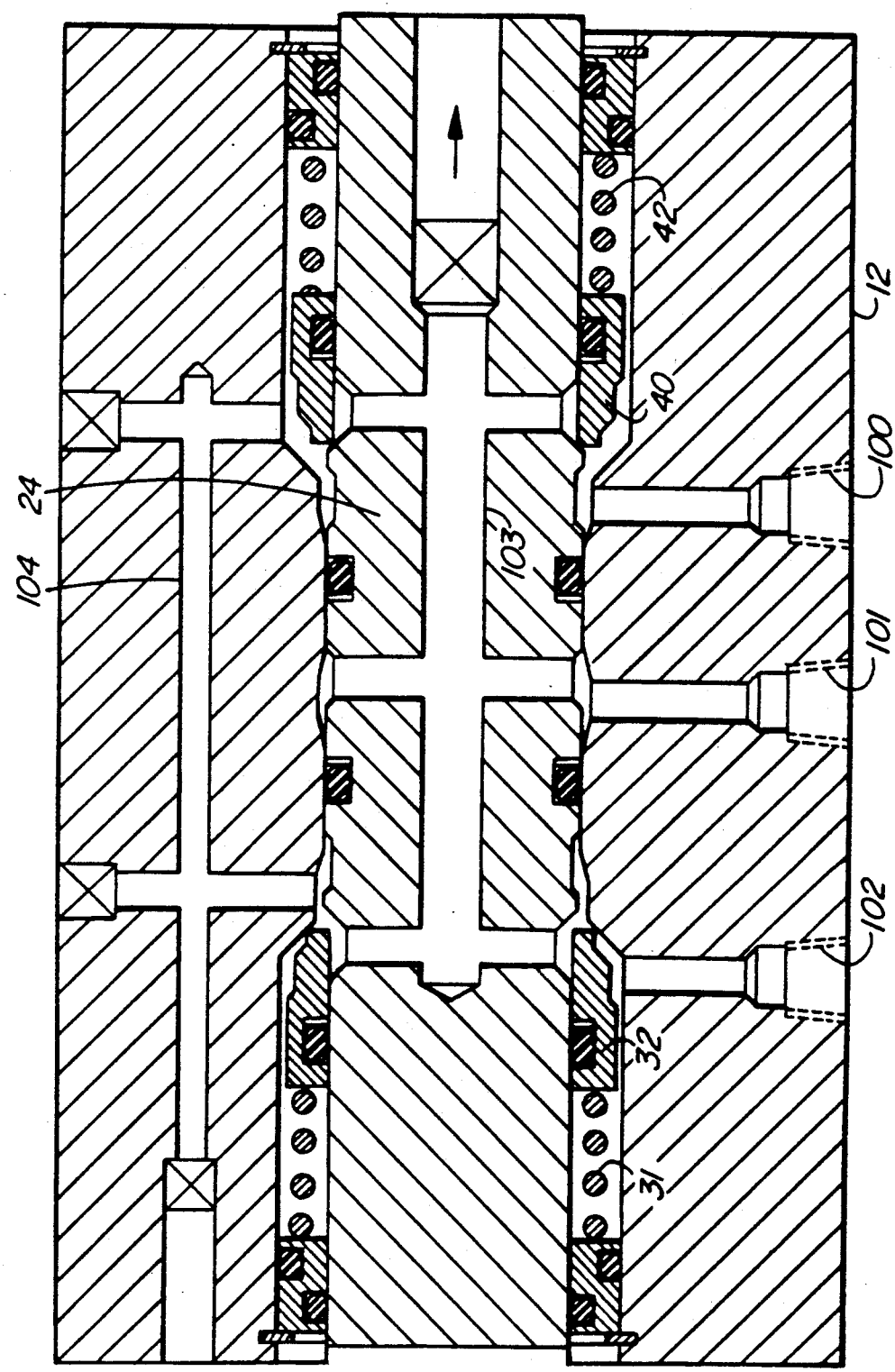

The pilot valve 10 senses the correct or normal pressure in the flowline 18 and assumes the position illustrated in FIG. 3A. Signal pressure is provided to the control port 220 of the latching relay valve 26 and creates a very small movement in the spool 201 such that the spool 201 assumes the armed position, again as illustrated in FIG. 4 but with the toggle 230 rotated a small distance beyond its latched position as shown in phantom in FIG. 4A.

With reference to FIG. 2, the mid point of the metal diaphragm 14 is intended to be adjusted so that the spool 24 contacts the transfer block 50 and the transfer block 50 contacts the spring button 52 and seats on the shoulder 53 of the upper body 13. Under normal operating conditions, therefore, the fluid pressure in the pipeline is such that the diaphragm 14 is in the position illustrated in FIG. 1 and FIG. 2A, with the poppet low seal ring 40 in contact with a flange of spool 24 as seen more clearly in FIG. 2A and likewise with poppet high seal ring 32 also in contact with a flange of spool 24.

In this position, the fluid entering inlet port 102 will flow around the spool annulus and traverses to crossholes 103. The fluid will flow around the poppet low seal ring 40 and exhaust at the signal port 100. The exhaust port 101 is simply vented to atmosphere at this time and is not yet functioning.

It will be assumed, however, that a low pressure condition occurs in the pipeline which may be caused by, for example, leakage. In this condition, the spool 24 will move downwardly with piston 23 and diaphragm 14 under the bias of low pressure spring 74 acting on thrust ring 72 and stress transfer screw 70 of transfer block 50. The poppet high seal ring 32 will maintain contact with its respective flange of spool 24 but the poppet low seal ring 40 will move out of contact with its respective flange on spool 24 by the movement of the spool 24 but, under the influence of poppet 42, the poppet low seal ring 40 will contact a flange on body 12.

The fluid entering inlet port 102, therefore, will be isolated and will be stopped. The signal fluid, however, will move around the annulus of the spool 24 from signal port 100, enter the cross hole 103 and exit from the exhaust port 101 thereby allowing operation of the latching relay valve 26 as will be described. This will initiate the shut down of the pipeline 18.

It will now be assumed that a high pressure condition is present within the pipeline 18 created, for example, by a blockage. In this event, the diaphragm 14 moves upwardly under the pressure from the pipeline with piston 23, spool 24 and transfer block 50 also moving upwardly, the low pressure spring 74 and the high pressure spring 54 opposing this movement.

In this condition and with reference to FIG. 2C, it will be seen that poppet low seal ring 40 again contacts a flange on spool 24 and moves away from body 12. Poppet high seal ring 32, however, is no longer in contact a flange on with its respective flange on spool 24 but does contact body 12. Again, therefore, the fluid entering inlet 102 is stopped, the signal fluid travels about the annulus of the spool 24, into the cross hole 103 through the cross port 104 and out the exhaust port 101 as with the low level pressure condition. Again, therefore, this will initiate action of the latching relay valve 26 and terminate flow in the pipeline.

Referring now to the operation of the latching relay valve 26 and with reference to FIGS. 4A and 4B, when the pressure in the flowline 18 becomes abnormal and is either higher or lower than the normal operating pressure desired in the flowline 18, the pilot valve 10 will exhaust the fluid from its signal port 100 and the spring 216 will move the spool 201 from the armed to the tripped position. In this latter position, poppet 202 will contact a flange on body 200, shutting off the flow between inlet port 221 and signal port 223 and bleeding the signal port 223 from shut in valve 19 to exhaust port 222. The internal spring (not shown) of shut in valve 19 will close the shut in valve 19 and terminate flow through the flowline 18.

There are several noteworthy areas of the pilot valve 10. Initially, it is noted that the pilot valve 10 initiates an emergency shut down situation for both a high and low pressure condition. This feature is obtained by using two poppets 32, 40 on a single spool 24 and is attractive because, normally, two separate pressure responsive pilot control valves will be required if it is desired to sense both high and low pressure conditions.

Another further feature, again related to the poppets 32, 40, is that the poppets open and close the fluid ports as desired thereby avoiding the use of O-rings moving over ports. If O-rings move over ports, it is stressful on the O-rings with the result that the O-rings can deteriorate over time and create a malfunctioning pilot.

The pilot valve according to the present invention may be used in other apparatuses than just pipelines. For example, it may be located in any process where the process is expected to operate within defined pressure limits. If these limits are exceeded, the pilot valve is able to initiate appropriate action responsive to those exceeded pressure limits.

Yet a further feature of the invention relates to the range of pressures that can be used. Because two springs are utilized, namely low pressure spring 74 for low pressure conditions and high pressure spring 54 for the high pressure condition, the range of operating pressures monitored may be increased substantially. An apparatus according to our previous U.S. Pat. Nos. 3,750,124 and 3,838,711 covers pressure ranges of approximately 750 to 4000 p.s.i but in the apparatus according to the present invention, a pressure range of 80 to 4000 p.s.i. is practicable. This is useful, particularly where reservoir pressures are low.

While specific embodiments of the invention have been described, such descriptions are intended to be made by way of example only and should be taken as illustrative of the invention and not as limiting its scope as defined in accordance with the accompanying claims.

What is claimed is:

1. A pilot valve responsive to pressure changes comprising a base housing; an inlet in said base housing exposed to a pressure to be monitored; a diaphragm in said inlet within said base housing; a lower body operably connected to said base housing; a spool movable within a cavity in said lower body; inlet, exhaust and signal ports extending from the outside of said lever body to said cavity; annular grooves in said spool communicating with cross ports within said body and crossholes within said spool, a first spring biased poppet seal ring mounted about said spool and being movable between a first position wherein said poppet seal ring contacts a first flange of said spool when said pressure is within normal operating pressure range and a second position out of contact with first flange of said spool and in contact with a first flange of said body when said pressure is one of either higher or lower than the normal operating pressure range by a predetermined amount.

2. A pilot valve as in claim 1 and further comprising a second biased poppet seal ring mounted about said spool and being movable between a first position wherein said poppet seal ring is in contact with a second flange of said spool when said pressure is within normal operating range and a second position out of contact with said second flange of said spool and in contact with a second flange of said body when said pressure is the other one of said higher or lower than said normal operating pressure range by a predetermined amount.

3. A pilot valve as in claim 2 wherein the axes of said first and second poppet seal rings and said spool are coaxial.

4. A pilot valve as in claim 3 wherein said diaphragm is a corrosion resistant metal.

5. A pilot valve as in claim 4 wherein said poppets open and close ports within said spool.

6. A pilot valve as in claim 5 and further comprising a first spring biased against said spool and being operable to move said spool downwardly from the position of said spool in the normal operating pressure range when a low pressure condition is present.

7. A pilot valve as in claim 6 and further comprising a second spring biased against said spool, said second spring being operable to resist said spool when said spool moves upwardly in response to a high pressure condition.

8. A pilot valve as in claim 7 wherein the axes of said first and second springs are coaxial.

9. A pilot valve as in claim 8 wherein the axis of said spool is coaxial with the axes of said first and second springs.

10. A pilot valve as in claim 1 wherein said first poppet seal ring is movable relative to said spool and said lower body.

11. A pilot valve as in claim 2 wherein said second poppet seal ring is movable relative to said spool and said lower body.

12. A pilot valve as in claim 6 wherein said bias in said first spring is adjustable.

13. A pilot valve as in claim 7 wherein said bias in said second spring is adjustable.

14. A pilot valve as in claim 1 and further comprising a three way latching relay valve for sensing a pilot control valve signal, said valve comprising a housing, a spool mounted for reciprocal movement within said housing, means to provide reciprocal movement to said spool, a signal sensing control port to provide fluid pressure acting on said spool, inlet, signal and exhaust ports extending from the outside of said body to said spool, a spring biased poppet seal ring mounted on said spool and being movable relative to said spool, said poppet moving between a first or armed position wherein said poppet seal ring contacts a flange of said spool and thereby allows fluid to be routed between said signal and inlet ports, and a second or tripped position out of contact with said flange of said spool wherein said poppet seal ring contacts a flange of said body and thereby allows fluid to be routed between said signal and said exhaust ports.

* * * * *